(No Model.)
C. W. SOMMERVILLE.
FAN ATTACHMENT FOR VELOCIPEDES OR OTHER VEHICLES.
No. 418,933. Patented Jan. 7, 1890.
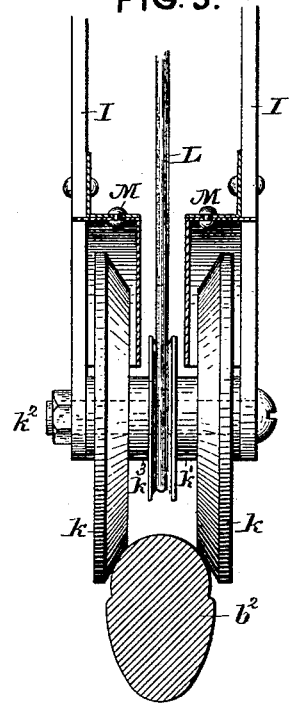
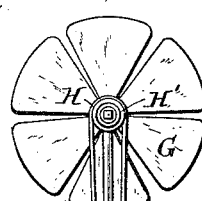
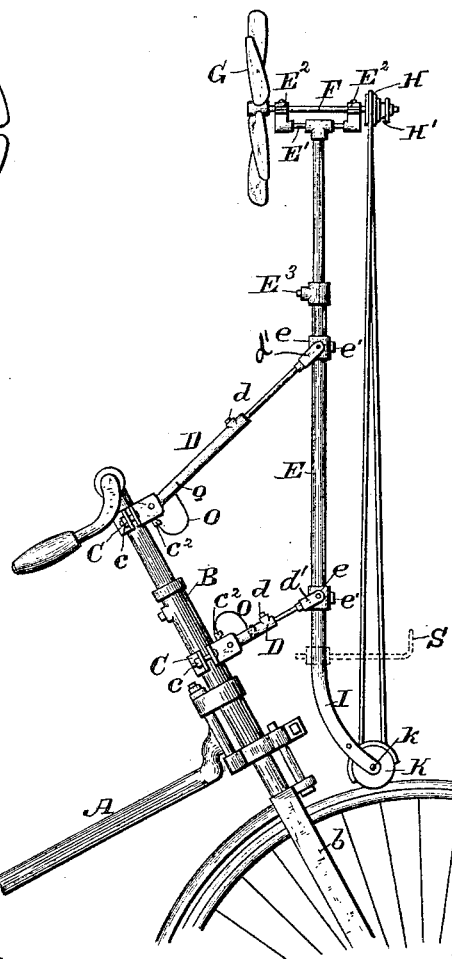
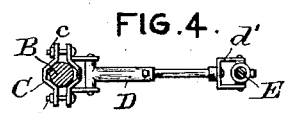
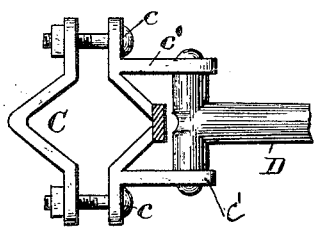
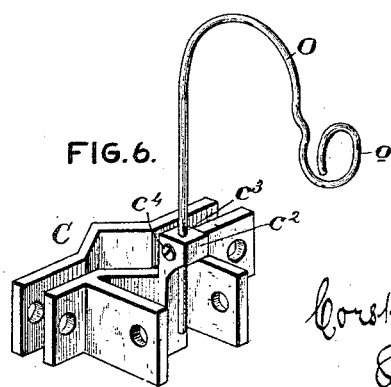
ATTEST.
J. Henry Kaiser
A. L. Evans
INVENTOR.
Corstorphine W. Sommerville

UNITED STATES PATENT OFFICE.

CORSTORPHINE W. SOMMERVILLE, OF WASHINGTON, DISTRICT OF COLUMBIA.

FAN ATTACHMENT FOR VELOCIPEDES OR OTHER VEHICLES.

SPECIFICATION forming part of Letters Patent No. 418,933, dated January 7, 1890.

Application filed September 7, 1889. Serial No. 323,249. (No model.)

*To all whom it may concern:*

Be it known that I, CORSTORPHINE W. SOMMERVILLE, a citizen of the United States, residing at Washington, in the District of Columbia, have invented certain new and useful Improvements in Automatic Fan Attachments for Velocipedes or other Vehicles; and I do hereby declare the following to be a full, clear, and exact description of the invention, such as will enable others skilled in the art to which it appertains to make and use the same.

The object of my invention is to provide an automatically-operated fan attachment for velocipedes and other vehicles, and is more particularly adapted to be attached to a bicycle or tricycle.

My said invention consists in certain novelty in the details of construction of the various parts and the means employed for attaching the same to a velocipede and for operating the fan, all of which I will now proceed to point out and describe, reference being had to the accompanying drawings, in which the fan is shown attached to a bicycle of the class which are commonly designated as "safety-bicycles."

In said drawings, Figure 1 is a side elevation of a portion of a bicycle provided with my invention. Fig. 2 is a detail showing a front elevation of the fan-standard, fan, and operating mechanism. Fig. 3 is an enlarged detail of the fork on the lower end of the fan-standard and the friction or contact wheel and pulley connected therewith. Fig. 4 is a detail showing a plan of one of the telescopic arms employed to secure the fan-standard to the bicycle-standard, the adjustable collar on the bicycle-standard being shown partly in section. Figs. 5 and 6 are enlarged details illustrating the means employed to secure the adjustable springs to the adjustable collars and hold the same in engagement with the telescopic arms.

Referring to said drawings, A represents the forward portion of the backbone of a safety-bicycle, and B the standard pivotally attached thereto and having on its lower end the usual fork $b$, in which the front wheel B' is mounted. Only the upper part of said wheel is shown.

$b'$ is the felly of the wheel, and $b^2$ the tire, which is made of rubber and is of the description ordinarily used.

C C are adjustable collars secured to the standard B by means of suitable bolts and nuts $c$. Said collars are provided with projecting lugs $c'$ and arranged one above the other and secured at the desired points on the bicycle-standard. Formed integral with one section of said collars are lugs or projections $c^2$, having holes $c^3$ extending through the same, for a purpose hereinafter described.

D D are telescopic arms, having their hollow sections pivotally secured to the lugs $c'$ of the adjustable collars, and are provided with set-screws $d$ for adjusting the arms the desired length. The outer adjustable sections of said arms are provided with forks $d'$.

E is a telescopic fan-standard.

$e$ are adjustable collars mounted on the fan-standard and provided with set-screws $e'$ for securing the same to said standard. To said collars $e$ the forks $d'$ of the telescopic arms are pivotally attached.

By means of the mechanism described the fan-standard may be given any desired inclination, and also adjusted to the standards of different kinds of bicycles.

The upper adjustable section of the telescopic fan-standard is provided on its upper end with a forked bracket E', in the ends of which are formed bearings $E^2$.

$E^3$ is a set-screw for securing the parts of the telescopic standard as adjusted.

F is a short spindle mounted in the bearings $E^2$.

G is a rotary fan mounted on the rear end of the spindle so as to face the rider.

H is a grooved pulley mounted on the front end of the spindle, and H' a smaller pulley, also mounted upon said spindle.

The lower end of the fan-standard is formed with an outwardly-curved fork I, which is arranged to project directly over the rim or tire of the forward wheel of the bicycle.

K is a friction or contact wheel mounted in the fork I and adapted to engage with the rim or tire of the bicycle-wheel. Said wheel K is preferably formed in two sections $k\ k$, having their inner faces beveled, said sections being mounted upon and united by a hub $k'$, which is mounted upon a bolt or spindle $k^2$, attached to the fork of the standard. A space is left between the sections of the friction or contact wheel, within which and mounted on the hub is a grooved pulley $k^3$. The beveled faces of the two sections of the friction or contact wheel engage with the periphery of the bicycle-wheel and are rotated by the contact therewith when the bicycle is in motion.

L is an endless belt connecting the pulley $k^3$ with one of the pulleys H or H'. When connected with the smaller pulley greater speed is given the fan, and vice versa.

M are segmental dust-guards secured to the forks of the fan-standard and extending over the sections of the friction or contact wheel. Said guards prevent the dust from being carried upward by the endless belt.

O are adjustable curved wire springs having one arm of the same substantially straight and forming a shank, which is mounted in the holes $c^3$ in the projections $c^2$ of the adjustable collars secured to the bicycle-standard. Said springs are secured as adjusted by means of set-screws $c^4$. The outer ends of the springs are formed with hooks $o$, which engage with the telescopic arms D, the spring on the lower arm being arranged to bear on top of the same, and the spring on the upper arm engaging with its under side. Said springs serve to hold the friction or contact wheel in engagement with the rim or tire of the bicycle-wheel, and by means of the set-screws referred to may be adjusted to have the desired tension. While said springs tend to hold the friction and bicycle wheels in engagement, they permit the telescopic arms to have a certain amount of play, so that should the bicycle receive any sudden jar by contact with a stone or other obstruction the fan-standard would rise with the wheel and prevent any breakage of the various parts, or should the jar disconnect the wheels the springs would immediately reseat the friction-wheel.

While I prefer to use the friction or contact wheel constructed as described, it is evident that an ordinary grooved or beveled wheel may be employed having a groove therein to receive the belt, forming a combined friction-wheel and pulley; or, if desired, the pulley may be attached to the side of the friction-wheel.

It will readily be seen that as the bicycle is propelled the fan will be rotated through the mechanism described, and will throw a current of air upon the rider, said fan rotating at a greater or less speed, according to the pulley with which the endless band is connected. By means of the adjustable arms and adjustable fan-standard the fan may be raised or lowered to the desired height, and also given the proper inclination to drive the current of air upon the rider. Said adjustable parts also permit the device to be attached to machines of different sizes and of any construction commonly used.

S indicates a lamp-bracket. (Shown in dotted lines.)

Having thus fully described my invention, what I claim as new, and desire to secure by Letters Patent, is—

1. A fan attachment for velocipedes, consisting of a standard adapted to be secured to the frame of the velocipede, a bearing formed in the upper end of the standard, a spindle mounted in said bearing, a fan secured to said spindle, a friction or contact wheel mounted on the lower end of the standard and adapted to engage one of the velocipede-wheels, and belt-connection between the friction-wheel and spindle, all constructed, arranged, and operating substantially as shown and described.

2. A fan attachment for velocipedes, consisting of an adjustable standard adapted to be secured to the frame of the velocipede, a bearing formed in the upper end of said standard, a spindle mounted in said bearing, a fan attached to said spindle, a friction or contact wheel mounted on the lower end of the standard and adapted to engage one of the velocipede-wheels, and band-connection between the friction-wheel and spindle, all constructed, arranged, and operating substantially as shown and described.

3. A fan attachment for velocipedes, consisting of an adjustable telescopic standard adapted to be attached to the frame of the velocipede, a bearing formed in the upper end of the standard, a spindle mounted in said bearing, a fan attached to said spindle, a contact or friction wheel mounted on the lower end of the standard and adapted to engage one of the velocipede-wheels, and band-connection between the friction-wheel and spindle, all constructed, arranged, and operating substantially as shown and described.

4. In a fan attachment for velocipedes, the combination, with a velocipede, of a fan-standard having pivoted connections with the frame of the velocipede, a bearing formed in the upper end of the fan-standard, a spindle mounted in said bearing, a fan attached to said spindle, a friction or contact wheel mounted in the lower end of the standard and engaging one of the velocipede-wheels, band-connection between the friction-wheel and spindle, and suitable springs engaging the pivoted connections of the fan-standard to hold the friction-wheel on said standard in engagement with the velocipede-wheel, all constructed, arranged, and operating substantially as shown and described.

5. In a fan attachment for velocipedes, the combination, with the velocipede-standard and forward wheel, of adjustable collars mounted on said standard, a telescopic fan-standard having adjustable collars mounted thereon, adjustable telescopic arms pivoted at one end to the collars on the velocipede-standard and at their other ends to the collars on the fan-standard, a bearing formed in the upper end of said fan-standard, a spindle mounted in said bearing, a friction or contact wheel mounted in the lower end of the fan-standard and adapted to engage the rim or tire of the forward wheel of the velocipede, and adjustable springs engaging with the telescopic arms to hold the friction-wheel in contact with the velocipede-wheel, all constructed, arranged, and operating substantially as shown and described.

6. A fan attachment for velocipedes, consisting of a standard adapted to be attached to the frame of a velocipede, a bearing formed in the upper end of said standard, a spindle mounted in said bearing, a fan attached to said spindle, a fork formed on the lower end of the standard, a friction-wheel K, mounted in said fork and formed in two sections $k\ k$, having their inner faces beveled and adapted to engage the rim or tire of one of the velocipede-wheels and mounted upon and united by a hub $k'$, a pulley $k^3$, mounted on said hub between the sections $k$, band-connection between said pulley and the fan-spindle, and segmental dust-guards secured to the fork of the standard and extending over the sections of the friction-wheel, all constructed, arranged, and operating substantially as shown and described.

In testimony whereof I affix my signature in presence of two witnesses.

CORSTORPHINE W. SOMMERVILLE.

Witnesses:
M. C. HOOKER,
H. P. MOZIER.